(12) United States Patent
Morisaki et al.

(10) Patent No.: US 9,587,494 B2
(45) Date of Patent: Mar. 7, 2017

(54) GAS TURBINE, GAS TURBINE BLADE, AND MANUFACTURING METHOD OF GAS TURBINE BLADE

(71) Applicant: Mitsubishi Hitachi Power Systems, Ltd., Nishi-ku, Yokohama (JP)

(72) Inventors: Tetsuro Morisaki, Tokyo (JP); Hisato Tagawa, Tokyo (JP); Manabu Yagi, Tokyo (JP); Yasuhiro Horiuchi, Tokyo (JP); Shinichi Higuchi, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 544 days.

(21) Appl. No.: 13/973,110

(22) Filed: Aug. 22, 2013

(65) Prior Publication Data

US 2014/0056719 A1    Feb. 27, 2014

(30) Foreign Application Priority Data

Aug. 27, 2012 (JP) .................. 2012-186046

(51) Int. Cl.
*F01D 5/18* (2006.01)
*B23P 15/04* (2006.01)
(Continued)

(52) U.S. Cl.
CPC ............... *F01D 5/186* (2013.01); *B22C 9/04* (2013.01); *B22C 9/10* (2013.01); *B23P 15/04* (2013.01);
(Continued)

(58) Field of Classification Search
CPC ........ F01D 5/186–5/189; Y02T 50/675; Y02T 50/676
(Continued)

(56) References Cited

U.S. PATENT DOCUMENTS 4,818,178 A * 4/1989 Sibbertsen .............. F01D 5/187
  415/115
6,036,440 A   3/2000 Tomita et al.
(Continued)

FOREIGN PATENT DOCUMENTS

CN         1690364 A       11/2005
EP       1 923 537 A2       5/2008
(Continued)

OTHER PUBLICATIONS

Chinese Office Action dated Dec. 1, 2014 (seven (7) pages).
(Continued)

*Primary Examiner* — Thomas Denion
*Assistant Examiner* — Laert Dounis
(74) *Attorney, Agent, or Firm* — Crowell & Moring LLP

(57) ABSTRACT

A gas turbine blade includes a hollow-blade-form portion formed by a leading edge on an upstream side of an working fluid of a gas turbine in a flow direction, a trailing edge on a downstream side of the working fluid in the flow direction, and a suction surface and a pressure surface reaching the trailing edge from the leading edge, and a shank portion for supporting the blade form portion. The blade also includes a partition for connecting the suction surface and the pressure surface in a hollow region of the blade-form portion, coolant paths formed by the partition, the suction surface, and the pressure surface, an impingement cooling hole formed in the partition for dividing the first path that is a flow path nearest to the leading edge side among the coolant paths and the second path adjacent to the first path, and first and second converter portions.

9 Claims, 7 Drawing Sheets

(51) Int. Cl.
*B22C 9/04* (2006.01)
*B22C 9/10* (2006.01)

(52) U.S. Cl.
CPC ............... *F01D 5/18* (2013.01); *F01D 5/187* (2013.01); *F05D 2230/211* (2013.01); *Y10T 29/49337* (2015.01)

(58) Field of Classification Search
USPC .......... 415/115, 116; 416/1, 95, 96 R, 97 R; 29/889.7–889.722
See application file for complete search history.

(56) References Cited

U.S. PATENT DOCUMENTS

| | | | |
|---|---|---|---|
| 6,227,804 B1 | 5/2001 | Koga et al. | |
| 8,096,768 B1 | 1/2012 | Liang | |
| 8,591,189 B2 | 11/2013 | Correia et al. | |
| 2002/0119045 A1* | 8/2002 | Starkweather | F01D 5/187 416/97 R |
| 2005/0091848 A1* | 5/2005 | Nenov | B23P 6/005 29/889.1 |
| 2006/0239820 A1* | 10/2006 | Kizuka | F01D 5/187 416/97 R |
| 2006/0257256 A1 | 11/2006 | Eastman et al. | |
| 2007/0041835 A1 | 2/2007 | Charbonneau et al. | |
| 2007/0258825 A1 | 11/2007 | Shadbolt et al. | |
| 2008/0118366 A1* | 5/2008 | Correia | F01D 5/187 416/97 R |
| 2008/0145234 A1* | 6/2008 | Lee | B22C 9/103 416/96 R |
| 2010/0200189 A1 | 8/2010 | Qi et al. | |

FOREIGN PATENT DOCUMENTS

| | | |
|---|---|---|
| JP | 2002-28751 A | 1/2002 |
| JP | 2003-322002 A | 11/2003 |
| JP | 2008-128234 A | 6/2008 |
| JP | 2008-151112 A | 7/2008 |
| JP | 2011-185129 A | 9/2011 |

OTHER PUBLICATIONS

European Office Action dated Apr. 7, 2015 (five (5) pages).
Japanese Office Action issued in counterpart Japanese Application No. 2012-186046 dated Oct. 13, 2015 (two (2) pages).
Chinese-language Office Action issued in counterpart Chinese Application No. 201310344195.7 dated Aug. 3, 2015 (Seven (7) pages).
European Search Report dated Mar. 31, 2014 (Eight (8) pages).

* cited by examiner

GAS TURBINE, GAS TURBINE BLADE, AND MANUFACTURING METHOD OF GAS TURBINE BLADE

CLAIM OF PRIORITY

The present application claims priority from Japanese patent application JP 2012-186046 filed on Aug. 27, 2012, the content of which is hereby incorporated by reference into this application.

BACKGROUND OF THE INVENTION

Field of the Invention

The present invention relates to a gas turbine, a gas turbine blade and a manufacturing method of gas turbine blade.

Description of Related Art

As a background art of this technical field, there is Japanese Laid-open Patent Application No. 2003-322002 (Patent Literature 1). This patent application states: "The refresh path extends through the inner wall in the radial direction, which inner wall is a boundary of the inner portion of the final flow path in the radial direction, and fluid-interconnects to the cooling air source. The refresh path to the leading edge feed flow path is connected to the flow-in entrance flow path of the serpentine cooling passage passing through the base of the blade and as a result, joins to the flow rate of the serpentine cooling passage. To adjust the flow rate and pressure to the leading edge feed flow path, independently of the flow through the serpentine cooling passage, the cooling flow passing through the refresh path can be adjusted."

Further, there exists Japanese Laid-open Patent Application No. 2008-151112 (Patent Literature 2). This patent application states: "The plurality of stub portions are mutually gathered in the valve portion connected to the shank portion, are radially extended outward, and are connected integrally with different rod portions among the rod portions so as to increase the strength of the cores."

{Patent Literature 1} Japanese Laid-open Patent Application No. 2003-322002

{Patent Literature 2} Japanese Laid-open Patent Application No. 2008-151112

SUMMARY OF INVENTION

The gas turbine blade is exposed to high-temperature and high-pressure combustion gas when the gas turbine is in operation. So that the gas turbine can function soundly even in a severe environment of high-temperature and high-pressure, the gas turbine blade may be operated while being cooled by internally ventilating it with cooling air.

For example, the cooling air is bleed air from a compressor and the use of cooling air leads to an increase in the compressor power and becomes a factor of a reduction in the thermal efficiency of the gas turbine. Further, for example, the cooling air, after cooling the turbine blade, is discharged into high-temperature gas and the combustion gas temperature falls. Therefore, it becomes a factor of a reduction in the thermal efficiency of the gas turbine.

To avoid the efficiency reduction, the turbine blade need to be cooled down to a temperature preferable in terms of reliability at as low a cooling air flow rate as possible. To cope with such a problem, in the patent literature 1 mentioned above, the adjustment mechanism of cooling air flow rate is described.

Further, the inner cooling air path of each blade, for example, using ceramics cores, is formed by precision casting. If some cores are cracked or distorted, or are shifted inside the blade form frame, depending on the extent, the inner cooling air path does not satisfy the allowance and the blade may become an inferior good. These are the factors which reduce the yield rate and increase costs. To cope with this problem, in the patent literature 2 mentioned above, the technology for improving the strength of the cores is described.

As an embodiment of a cooling structure with high cooling performance, there are an impingement cooling structure and a film cooling structure. These structures have a high cooling performance, though they are a fine structure, so that the adjustment of cooling air is difficult and the control of dimensional allowance is difficult. Further, the cores are apt to reduce in strength and are easily damaged. As mentioned above, the structure having a high cooling performance is apt to reduce the productivity and increase the cost.

In the gas turbine blade, as described above, both the high cooling performance and productivity need to be attained. However, in the patent literature 1, the pressure adjustment technology using refresh air is disclosed, though there is no description relating to the core strength. In the patent literature, technology to improve core strength is disclosed, though there is no description relating to the pressure adjustment technology.

Furthermore, for the pressure adjustment technology, a wider adjustment range than that of the prior technology is required and the core strength is required for higher strength than that of the prior technology.

Further, an easy inspection during production and an easy discovery of inferior goods lead to a reduction in the inspection man-hour and a reduction in the cost.

The present invention has been made in view of the above and an object of the present invention is to provide a gas turbine and a gas turbine blade having both excellent cooling performance and productivity.

To solve the above problems, for example, the constitution described in the claim is used.

A gas turbine blade of the present invention comprising: a hollow blade form portion formed by a leading edge on an upstream side of an working fluid of a gas turbine in a flow direction, a trailing edge on a downstream side of the working fluid in the flow direction, and a suction surface and a pressure surface reaching the trailing edge from the leading edge, and a shank portion for supporting the blade form portion, characterized in that, the gas turbine blade is further comprising: a partition for connecting the suction surface and the pressure surface in a hollow region of the blade form portion, coolant paths formed by the partition, the suction surface, and the pressure surface, an impingement cooling hole formed in the partition for dividing a first path which is a flow path nearest to the leading edge side among the coolant paths and a second path adjacent to the first path, a first converter portion which is installed between the blade form portion and the shank portion for connecting the second flow path and a third flow path adjacent to the second flow path, and a second converter portion which is installed at a tip on the blade form portion side for connecting the third flow path and a fourth flow path adjacent to the third flow path, wherein: at least, the first flow path and the second flow path are extended to an outer peripheral side end of the blade form portion, and an outer peripheral side plate made of a different member from the blade form portion is attached on an outer peripheral side of the blade form portion and defines outermost peripheral ends of the first flow path and the second flow path.

According to the present invention, a gas turbine and a gas turbine blade having both excellent cooling performance and productivity can be provided. The problems, constitutions, and effects other than the aforementioned will be made clear by the explanation of the following embodiments.

DETAILED DESCRIPTION OF THE INVENTION

Hereinafter, the embodiments of the present invention will be explained by referring to the accompanying drawings.

Firstly, the constitution of a gas turbine which is an application object of the present invention will be explained by referring to FIG. 2.

Figure 2:
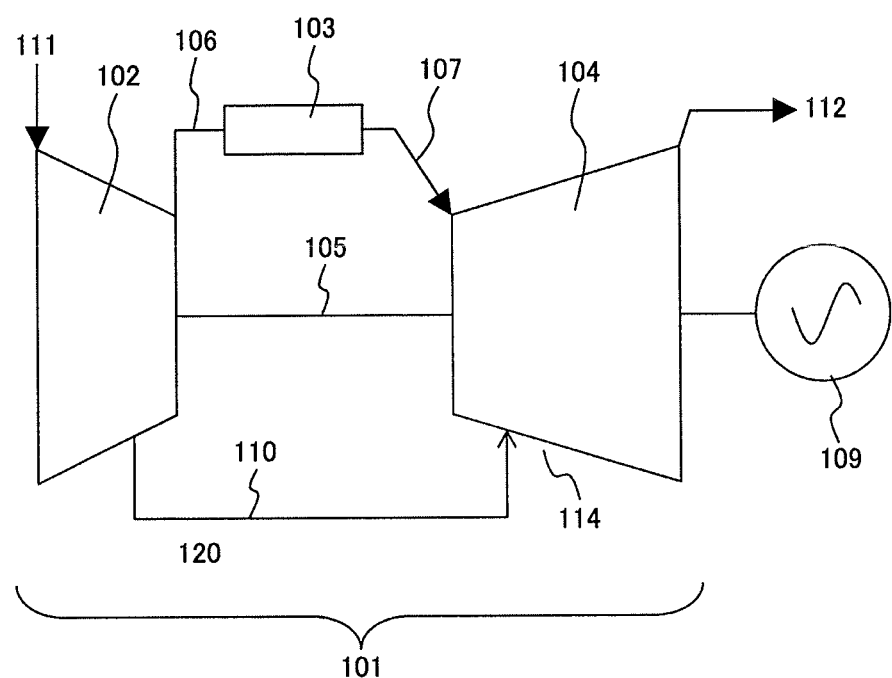
FIG. 2 is an embodiment of the block diagram of a gas turbine.

In the FIG. 2, a gas turbine 101 is composed of, for example, a compressor 102, a combustor 103, and a turbine 104. The compressor 102 compresses air 111, generates compressed air 106, and supplies the generated compressed air 106 to the combustor 103. The combustor 103 mix-burns the compressed air 106 generated by the compressor 102 and fuel, generates combustion gas 107 which is working fluid of the gas turbine 104, and discharges the combustion gas 107 into the turbine 104.

The turbine 104, by the combustion gas 107 which is discharged from the combustor 103 and is increased in the energy of the compressed air, generates rotation force in a turbine shaft 105. By the rotation force of the turbine shaft 105, a device 109 connected to the gas turbine 101 is driven. The combustion gas 107, as exhaust gas 112 after the energy is captured by the turbine 104, is discharged via an exhaust diffuser 113. Further, a part 120 of the air compressed by the compressor 102 is bled as turbine cooling air 110 and is fed to the turbine 104 as cooling air without passing through the combustor 103.

Figure 3:
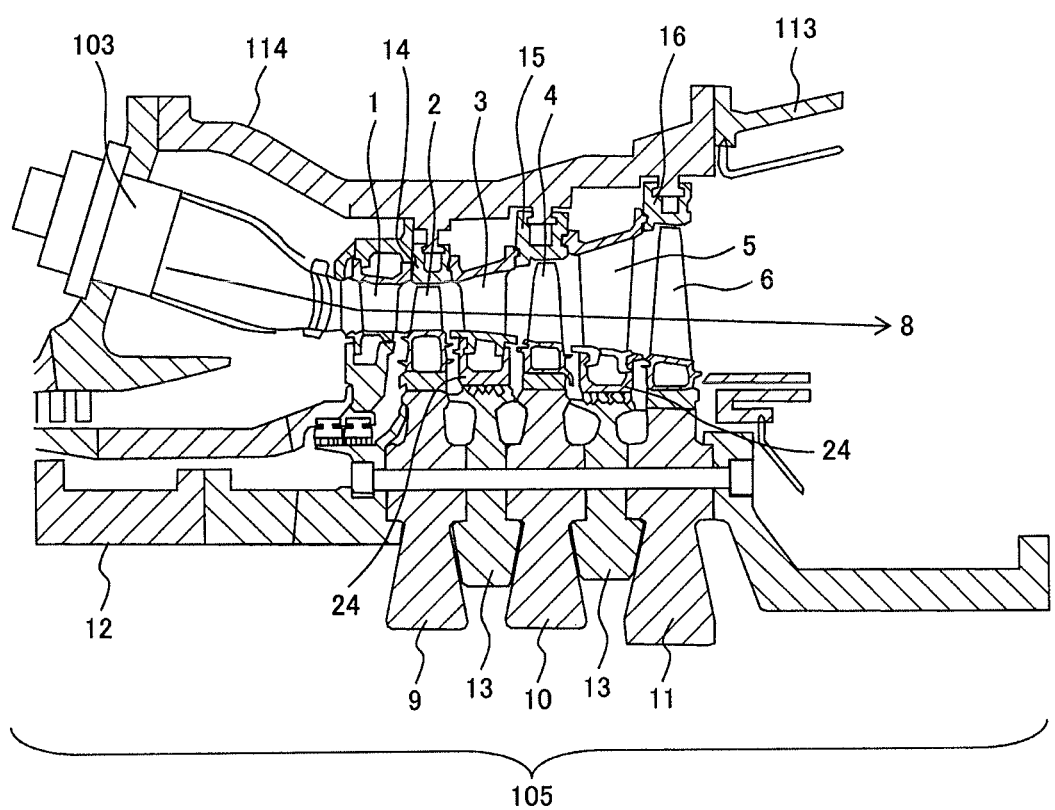
FIG. 3 is an embodiment of the partial cross sectional view of a gas turbine.

FIG. 3 shows an embodiment of the partial cross sectional view of a gas turbine.

In the FIG. 3, a numeral 1 shown in the drawing indicates a first stage nozzle, 2 a first stage blade, 3 a second stage nozzle, 4 a second stage blade, 5 a third stage nozzle, and 6 a third stage blade and an arrow 8 indicates a flow direction of the combustion gas 107 in the turbine.

The first stage blade 2 is connected to the outer periphery of a first stage wheel 9, is stacked by a stacking bolt together with a second stage wheel 10 with the second stage blade 4 connected to, a third stage wheel 11 with the third stage blade 6 connected to, a compressor rotor 12 connected to the compressor 102, and a spacer 13, and composes the turbine shaft 105. The turbine shaft 105 captures the energy of the combustion gas 107 discharged from the combustor 103 by the first stage blade 2, the second stage blade 4, and the third stage blade 6 and drives the compressor 102 and the device 109 such as a generator connected to the turbine shaft end.

The turbine shaft 105 is involved in a casing 114. In the casing 114, the first stage nozzle 1, the second stage nozzle 3, the third stage nozzle 5, a first stage shroud 14, a second stage shroud 15, and a third stage shroud 16 are connected on the inner peripheral side, and furthermore on the inner peripheral side of the second stage nozzle 3 and the third stage nozzle 5, a diaphragm 24 is connected, respectively.

Further, the cooling air 110 passes through the inside of the turbine shaft 105, reaches the base portion of the first stage blade 2 and the second stage blade 4 via a path (not shown) installed between the first stage wheel 9 and the spacer 13 and between the second stage wheel 10 and the spacer 13, and flows into the blade. The air finishing to cool the first stage blade 2 and the second stage blade 4 is discharged from the inside of the blade to the outside, is mixed with the combustion gas 107, and is discharged outside the gas turbine 101 as exhaust gas 112.

(First Embodiment)

Figure 1:
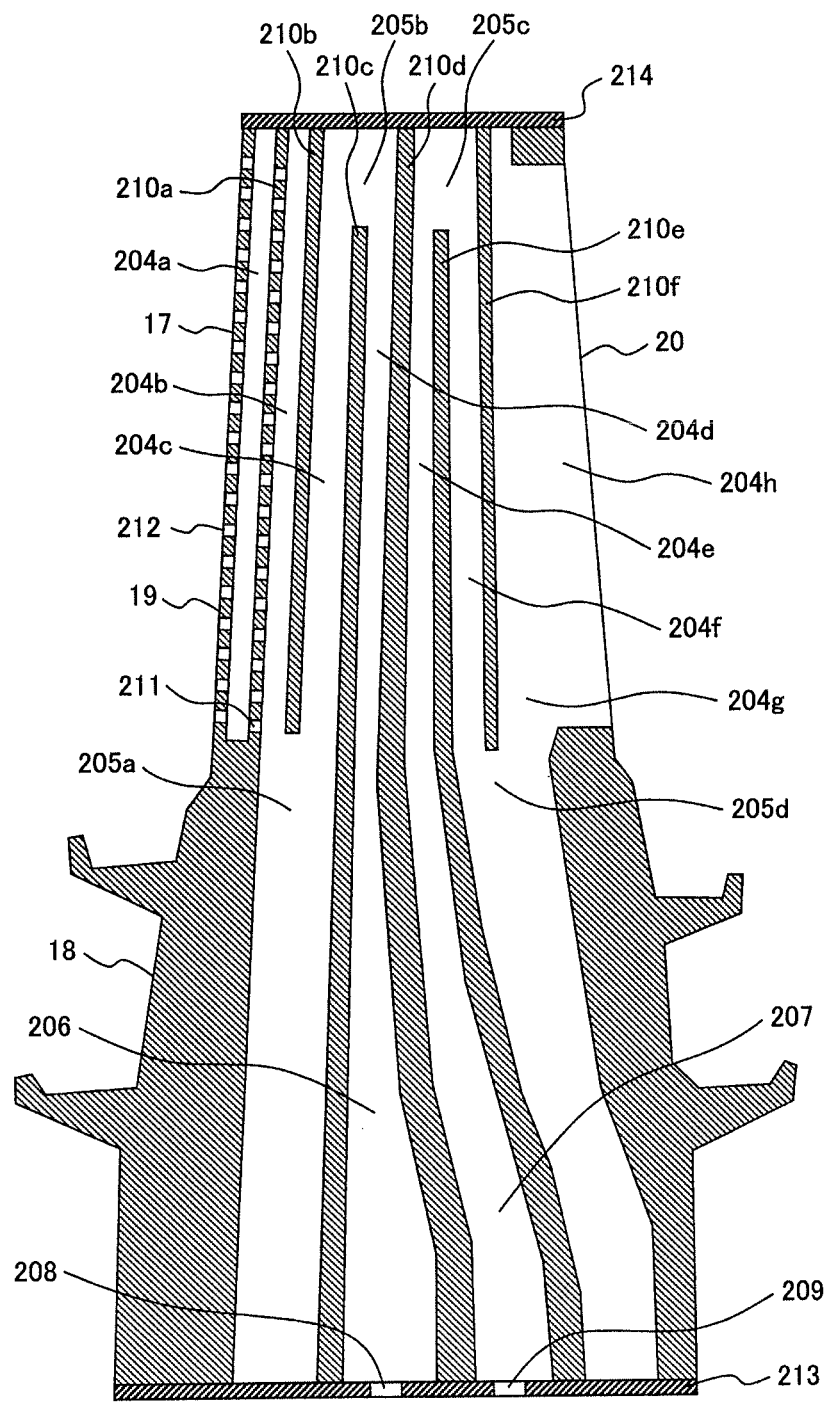
FIG. 1 is an embodiment of the cross sectional view of the turbine cooling blade of the first embodiment in the present invention.

In this embodiment, the gas turbine blade combined with both excellent cooling performance and productivity will be explained. FIG. 1 shows an embodiment of the cross sectional view of the first stage blade 2 of the gas turbine 101 of the first embodiment in the radial direction.

In the FIG. 1, the first stage blade 2 includes a blade form portion 17 and a shank portion 18. The blade form portion 17 is composed of a leading edge 19 on the upstream side in the flow direction of the combustion gas which is an working fluid, a trailing edge 20 on the downstream side, and the turbine blade pressure surface in the concave external form and the turbine blade suction surface in the convex external form installed between the leading edge 19 and the trailing edge 20. The shank portion 18 is positioned on the inner peripheral side of the gas turbine from the blade form portion 17 and supports the blade form portion 17.

The inside of the first stage blade 2 is hollow and a cooling path is formed here. And, the compressed air bled from the compressor 102 flows into the cooling path from the shank base portion.

The cooling path is formed as cooling paths 204a, 204b, 204c, 204d, 204e, 204f, 204g, and 204h of coolant paths by partitions 210a, 210b, 210c, 210d, 210e, and 210f for connecting the pressure surface and suction surface in the hollow region of the blade form portion 17, the pressure surface, and the suction surface. The respective cooling paths 204a, 204b, 204c, 204d, 204e, 204f, 204g, and 204h are connected by convertors 205a, 205b, 205c, and 205d. For example, the convertors 205b and 205c are positioned on the outer peripheral side (tip) of the blade form portion 17 and the convertors 205a and 205d are positioned between the blade form portion 17 and the shank portion 18.

Further, in this embodiment, bearing the constitution attached to the turbine shaft 105 in the mind, the side of the shank portion 18 is referred to as an inner peripheral side and the side of the blade form portion 17 is referred to as an outer peripheral side.

There are two paths of cooling air available, and one is a front side serpentine cooling path 206 passing through the cooling paths 204d, 204c, and 204b and the converter portions 205a and 205b from a front side cooling air feed hole 208 and reaching the cooling path 204a via a leading edge impingement hole 211, and the other one is a rear side serpentine cooling path 207 reaching the cooling path 204h at the trailing edge of the blade via the cooling paths 204e, 204f, and 204g and the converter portions 205c and 205d from a rear side cooling air feed hole 209.

Respectively inside the front side serpentine cooling path 206 and the rear side serpentine cooling path 207, a turbulent flow promotion rib (not shown) is installed. The rib disturbs the flow of cooling air by its projection. The rib changes the disturbance form due to the shape, so that depending on the shape of the rib arranged, the thermal conductivity of the rib installation surface changes. Therefore, it is desirable to arrange an appropriately shaped rib according to a thermal load. By the appropriate rib arrangement, the metal temperature can be made uniform and the thermal stress can be suppressed.

Further, on the front side of the cooling path 204a which is a flow path nearest to the side of the leading edge 19 among the cooling paths, a film cooling hole 212 for performing film cooling on the outside surface of each blade is formed. The film cooling is a heat insulation technique of injecting cooling air from a small hole and reducing the temperature of the combustion gas 107 in the neighborhood of the outside surface of each blade and has a high cooling performance. Furthermore, for example, the convection cooling effect cannot be expected for the cooling air that has risen to a temperature almost equivalent to the temperature of the blade as a result of having cooled the blade from the inside; however, even such cooling air can be used for film cooling because its temperature is lower than the combustion gas temperature. Therefore, to obtain a higher cooling performance at a low cooling air flow rate, it is desirable to use the cooling air as film air after a plurality of paths are cooled as in this embodiment. However, there is a case that the pressure of the cooling air is reduced excessively due to passing through a plurality of paths, so that it cannot be continued endlessly and, as mostly described in the present embodiment, series connection of about 4 flow paths is a limit.

The characteristics of this embodiment are that the cooling path 204a is structured so as to be connected with the cooling path 204b through the plurality of impingement holes 211, and further, these cooling paths 204a, 204b are extended to the end of the blade form portion 17 on the outer peripheral side, and the outermost peripheral end is defined by an outer peripheral side plate 214. Further, the converter portion 205b for connecting the cooling path 204c and the cooling path 204d is extended to the end of the blade form portion 17 on the outer peripheral side, and the outermost peripheral end is defined by the outer peripheral side plate 214. In addition, the converter portion 205a for connecting the cooling path 204b and the cooling path 204c and the cooling path 204d are extended to the end of each blade on the inner peripheral side and the innermost peripheral end is defined by an inner peripheral side plate 213. Further, the inner peripheral side plate 213 and the outer peripheral side plate 214 are composed of different members from the blade form portion 17 and the shank portion 18 and are structured so as to be attached at the process of brazing, welding, or adhesion using an adhesive subsequent to the precision casting.

Further, it is one of the characteristics that the cooling paths 204a, 204b and the converter portion 205b are extended to the outside end of the blade form portion 17, and the cooling path 204d and the converter portion 205a are extended to the end of the shank portion 18 on the inner peripheral side, respectively maintaining their cross-sectional areas of the paths (without reducing the cross-sectional areas of the paths).

Figure 4:
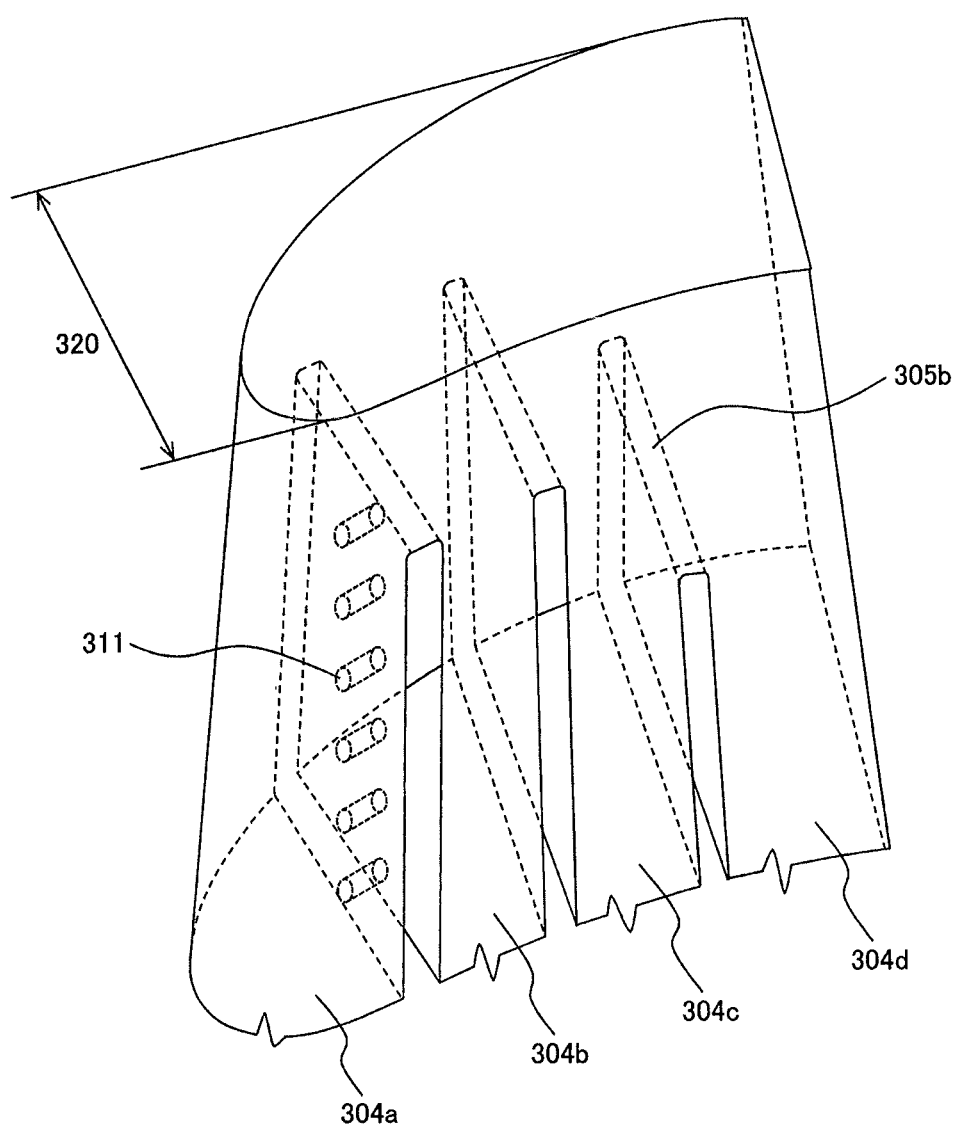
FIG. 4 is an embodiment of shape of the cores on the outer peripheral side for forming the turbine cooling blade of the first embodiment.

Here, the manufacture of the turbine blade relating to this embodiment will be explained. FIG. 4 shows the shape of the cores on the outer peripheral side used to form the turbine blade of this embodiment. It is a core 304a which forms the cooling path 204a, and it is a core 304b which forms the cooling path 204b, and it is a core 304c which forms the cooling path 204c, and it is a core 304d which forms the cooling path 204d. Further, the impingement hole 211 is formed by an impingement core 311. Further, it is a converter core 305b which forms the converter portion 205b.

The cores 304a, 304b and the converter core 305b are extended to the end of the blade on the outer peripheral side so as to maintain the cross-sectional area of the cooling path, and are joined to each other at the end on the outer peripheral side.

Figure 5:
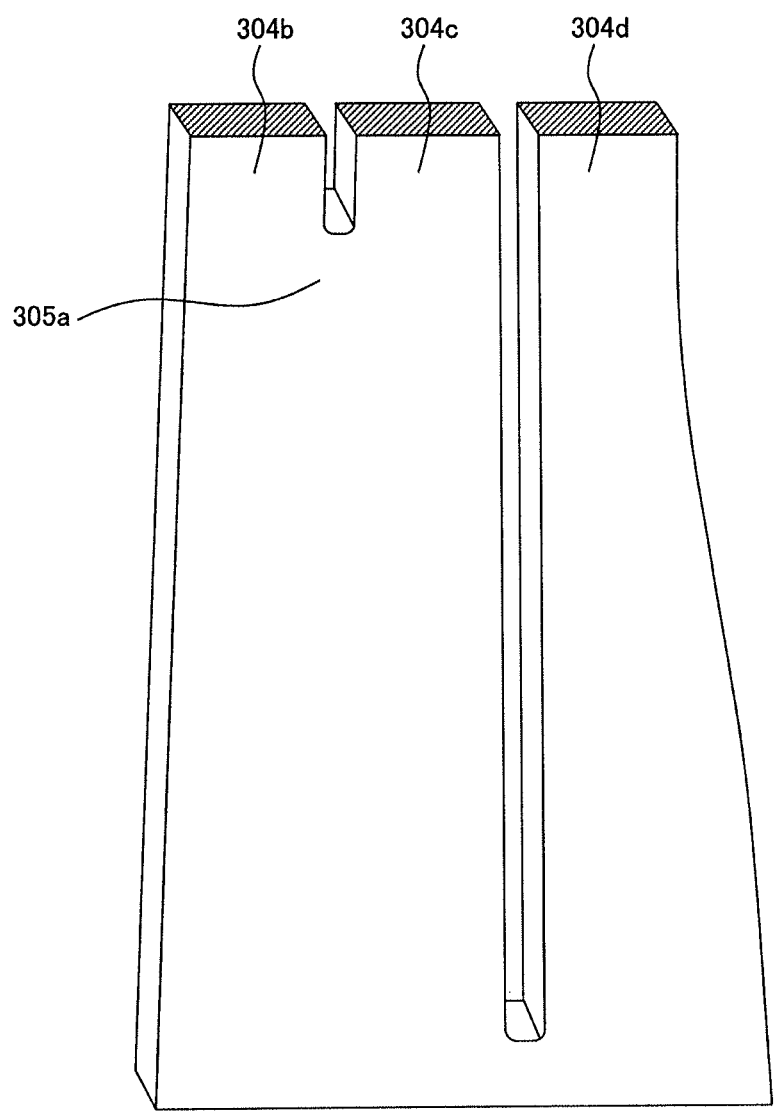
FIG. 5 is an embodiment of shape of the cores on the inner peripheral side for forming the turbine cooling blade of the first embodiment.

FIG. 5 shows the shape of the cores on the inner peripheral side used to form the turbine blade of this embodiment. The portions indicated with the same symbols as those shown in FIG. 4 are the same portions.

The converter portion 205a is formed by a converter core 305a and the core 304d is formed so as to extend to the inner peripheral side end of the blade without reducing the cross-sectional area of the flow path. Furthermore, the converter core 305a is structured so as to extend to the inner peripheral side end of the blade by almost keeping the cross-sectional area of the path.

By use of the constitution mentioned above, at the time of manufacture by the precision casting, the cores 304b, 304c, and 304d, in the blade form frame, can be supported on both sides at the inner peripheral side end and the outer peripheral side end, and further, the core 304a can be supported at a plurality of points on the outer peripheral side of the blade together with the impingement core 311. Furthermore, the cores for forming all the paths are extended so as to maintain the cross-sectional areas of the paths and the strength can be ensured by the wide cross-sectional areas, so that the support can be strengthened.

Particularly, the impingement core 311 has a stick-shaped structure with a small diameter, so that generally, the strength of the cores is apt to reduce. However, in the manufacture of the blade of this embodiment in which the cooling paths 204a and 204b are extended to the outer peripheral end of the blade form portion 17, the cores 304a and 304b are supported strongly from the outer peripheral side end, so that the application of force to the impingement core 311 is suppressed. By doing this, the reduction in the yield rate due to damage of the cores can be suppressed.

Further, in the region other than the outer peripheral side end and inner peripheral side end, the adjacent cores are connected to each other. The cores between each path are connected, thus the displacement between each flow path can be suppressed.

Further, the cross-sectional shape of the turbine blade in the peripheral direction is generally a crescent shape. Particularly, in the outer periphery of each blade, the connection of a plurality of cores in the axial direction leads to an increase in an apparent thickness 320 in the structure and the bending strength is improved. By doing this, the bending of the cores is suppressed, so that the displacement caused by the core bending in the blade form frame at the time of precision casting is suppressed and the yield rate can be improved.

Further, the cores, at the time of manufacture by precision casting, use a process of, for example, destroying them by chemicals treatment and removing from the inside of each blade. At this time, in consideration of penetration of the chemicals, the cores need to be structured so as to include many pores, but this causes a reduction in the strength of the cores. According to the constitution of this embodiment, the cores can be removed from both the inner peripheral side of each blade and outer peripheral side, and compared with the conventional type, the opening particularly on the outer peripheral side of each blade can be made larger, so that the removability of the cores is better. Therefore, compared with the conventional type, cores with a smaller pore rate and a higher material strength can be used. According to this embodiment, there is a room left for improvement of structural strength and strength improvement from the viewpoint of the core material, so that due to the synergistic effect of the two, extensive strength improvement is enabled.

Further, the impingement hole 211 is formed by a core. The impingement hole 211 is a structure of the inner surface of the blade, so that if the outermost end of the blade is integrally formed by the precision casting, the inside cannot be viewed, so that the evaluation of soundness may need inspection requiring labor and man-hour such as flow rate confirmation by the flow rate test and inspection using the non-destructive test technique such as X-ray. However, in the constitution of this embodiment, the outside end of each blade is plate-sealed after the precision casting, so that at the stage before the plate sealing, visual confirmation is enabled and obvious inferior goods can be removed by visual inspection. By doing this, the inspection man-hour can be reduced, thereby contributing to cost reduction.

Further, the inner surface of each cooling path, to suppress high-temperature oxidation, may be coated. The outer peripheral end of each blade is formed in the plate sealing structure, thus the opening area on the outer peripheral side of the blade can be made large and the accessibility to the inside is increased. By doing this, the coating enforcement property is increased, so that particularly inside the cooling path 204a, the manufacturing processes and time can be reduced, thereby contributing to cost reduction.

As described above, according to the constitution of this embodiment, a gas turbine blade and a gas turbine having a high manufacture property including a film cooling and impingement cooling structure showing a high cooling property can be provided.

(Second Embodiment)

In this embodiment, an embodiment of a gas turbine and gas turbine blade will be explained where in addition to the characteristics of the first embodiment, the cooling air flow rate of the turbine blade can be adjusted easily, the adjustment range is wide, and the cost is low.

Figure 6:
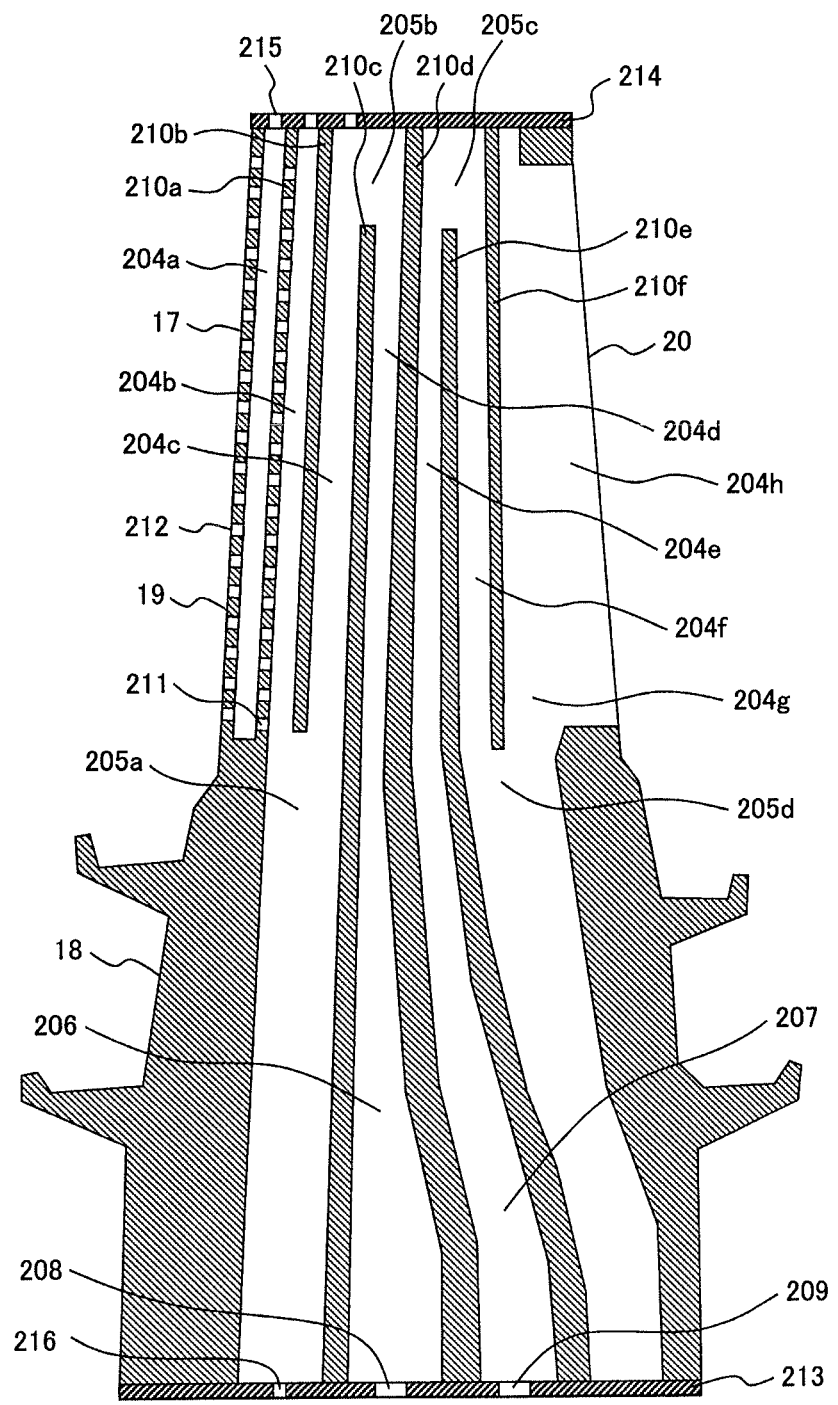
FIG. 6 is an embodiment of the cross sectional view of the turbine cooling blade of the second embodiment in the present invention.

FIG. 6 is a cross-sectional view of the first stage blade 2 of the second embodiment in the radial direction. In the drawing, among the turbine blade shown in FIG. 1, the inner peripheral side plate 213 and the outer peripheral side plate 214 are provided with an orifice 215, 216, respectively. The other constitutions have the constitutions with the same reference numerals and the same functions as shown in the first embodiment in FIG. 1, which are explained already, so the explanation of them will be omitted.

For example, for the turbine blade, after finishing the general processing, the cooling air flow rate test may be executed as a 100% test or a sample test. In the flow rate test, for example, specified pressure is applied to the cooling paths 206 and 207 and the cooling air flow rate flowing at that time is measured. By this test, the deviation between the measured value of the cooling air flow rate and the design value can be obtained. In the conventional type, to control the deviation to the allowable value or less, may adjust the hole diameters of the front side cooling air feed hole 208 and the rear side cooling air feed hole 209.

Here, the structure of injecting cooling air via a small hole such as the film cooling hole 212 and the impingement hole 211 is large in flow rate change due to hole diameter, so that if the dimensional allowance of the hole diameter is not made smaller, it may be difficult to adjust the cooling air flow rate only by the cooling air feed holes 208 and 209. If the dimensional allowance is made smaller like this, the yield rate is reduced and an undesirable cost increase is caused. Particularly, the impingement hole 211 is formed by precision casting, so that the management of the dimensional allowance is difficult.

In this embodiment, the structure is so made that the inner peripheral side plate 213 and the outer peripheral side plate 214 are provide with orifices 215, 216, respectively, thereby increasing the adjustment allowance of the cooling air flow rate, thus it is enabled to set the tolerance larger. The orifice is structured on a plate prepared at a different process from the precision casting, so that it can be processed by a machine and high processing precision can be obtained easily, so that the cooling air flow rate can be adjusted accurately.

If the finished size of the impingement hole 211 is too small, it is a concern that the air flow rate passing through the cooling paths 204a and 204b may be insufficient, but according to the constitution of this embodiment, for example, the outer peripheral side plate 214 is provided with an adjustment hole 215 as an orifice by machining, thus the pressure of the cooling path 204a can be reduced and the impingement flow rate can be increased.

Further, for example, the inner peripheral side plate 213 is provided with an adjustment hole 216 as an orifice, thus the pressure of the cooling path 204b can be increased and the impingement flow rate can be increased. Further, the two are combined, thus the impingement flow rate can be increased.

As mentioned above, according to this embodiment, a gas turbine and a gas turbine blade can be provided where the adjustment allowance is high due to rich flow rate adjustment allowance method, productivity is superior due to large dimensional allowance, the core strength is strong, and the yield rate is high, thereby reducing cost.

(Third Embodiment)

In this embodiment, an embodiment of a gas turbine and a gas turbine blade will be explained where in addition to the characteristics of the first and second embodiments, the cooling air flow rate of the turbine blade can be adjusted easily and the adjustment range is wide.

Figure 7:
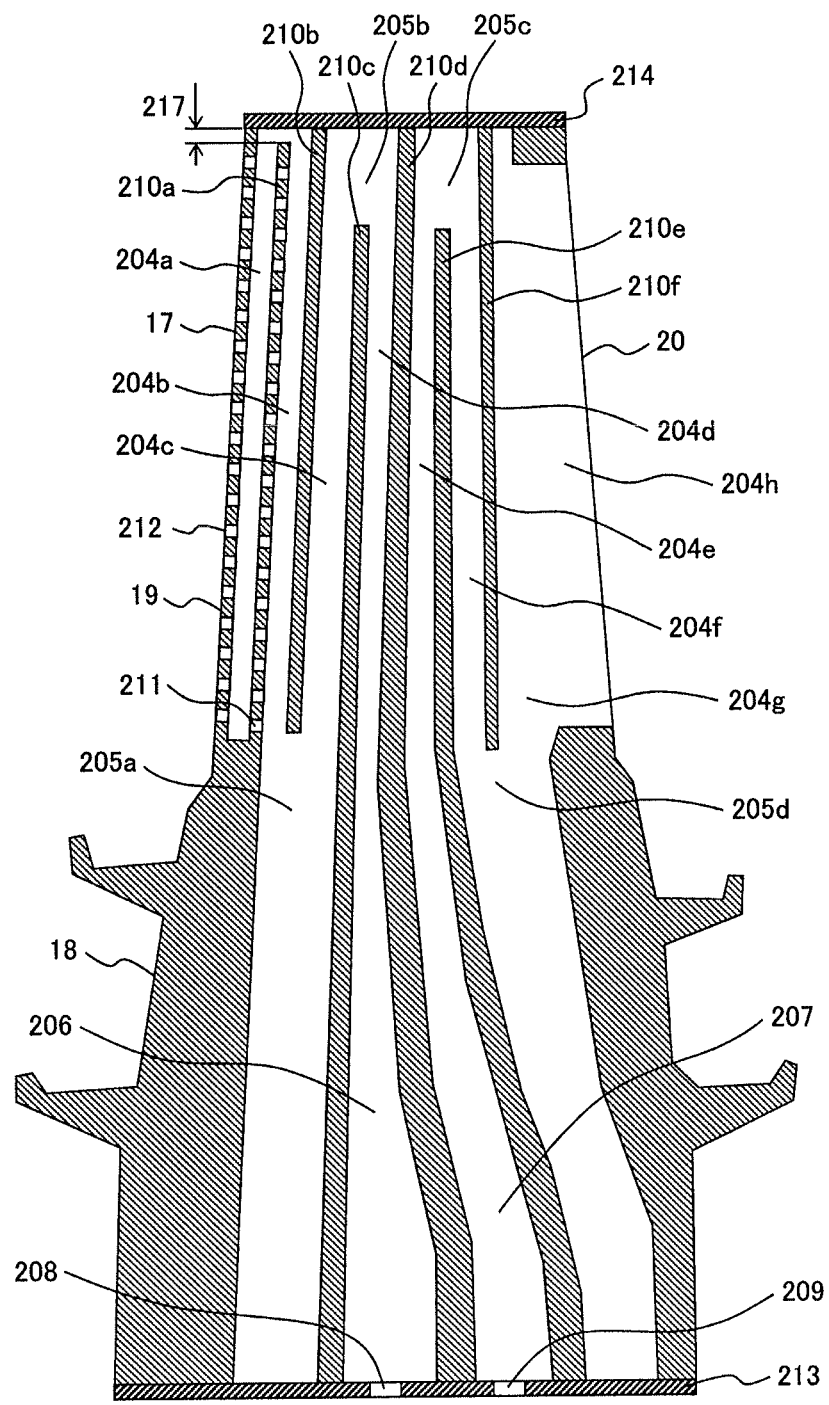
FIG. 7 is an embodiment of the cross sectional view of the turbine cooling blade of the third embodiment in the present invention.

FIG. 7 is a cross-sectional view of the turbine blade of the third embodiment in the radial direction. In the drawing, among the turbine blade shown in FIG. 7, a cut portion 217 is formed in the upper part of the partition 210a and a fluid interconnection portion other than the impingement hole 211 is installed. The other constitutions have the constitutions with the same reference numerals and the same functions as shown in the first embodiment in FIG. 1, which are explained already, so the explanation of them will be omitted.

Here, the structure of injecting cooling air via a small hole such as the impingement hole 211 is large in flow rate change due to hole diameter, so that if the dimensional allowance of the hole diameter is not made smaller, it may be difficult to adjust the cooling air flow rate only by the cooling air feed holes 208 and 209. If the tolerance is made smaller, the yield rate is reduced and an undesirable cost increase is caused. Particularly, the impingement hole 211 is formed by precision casting, so that the management of the dimensional allowance is difficult.

In this embodiment, the cut portion 217 is installed, so that, for example, even when the flow rate passing through the impingement hole 211 becomes insufficient due to a factor such as a manufacture error, the cut portion 217 structures a new flow path and the cooling air flow rate flowing into the cooling path 204a is increased, thus the cooling air is reserved. The reason that such processing can be performed easily is that the outer peripheral side plate 214 is made of a different member from the blade form portion 17 and is structured so as to be attached later.

According to this embodiment, the adjustment allowance of cooling air can be increased like this, so that the tolerance can be made larger and the cost can be reduced.

Further, the present invention is not limited to the embodiments mentioned above and includes various modifications. For example, the embodiments mentioned above are explained in detail so as to explain the present invention in a clear way, and the present invention does not always include all the constitutions explained. Further, a part of the constitutions of a certain embodiment can be replaced with the constitutions of another embodiment and to the constitutions of a certain embodiment, the constitutions of another embodiment can be added. Further, for a part of the constitutions of each embodiment, other constitutions can be added, deleted, or replaced.

For example, in some embodiment, the front side serpentine cooling path 206 is explained, though the similar constitutions may be applied to the rear side serpentine cooling path 207. To the rear side serpentine cooling path 207, the similar constitutions are applied, thus the yield rate of the blade is improved and the cost can be reduced.

The invention claimed is:

1. A manufacturing method of a gas turbine blade comprising a hollow blade form portion formed by a leading edge on an upstream side of a working fluid of a gas turbine in a flow direction, a trailing edge on a downstream side of the working fluid in the flow direction, a suction surface and a pressure surface reaching the trailing edge from the leading edge, and a shank portion for supporting the blade form portion, a partition for connecting the suction surface and the pressure surface in a hollow region of the blade form portion, coolant flow paths formed by the partition, the suction surface, and the pressure surface, an impingement cooling hole formed in the partition, the partition dividing a first coolant flow path nearest to the leading edge side among the coolant paths and a second coolant flow path adjacent to the first coolant flow path, a first converter portion which is installed between the blade form portion and the shank portion for connecting the second coolant flow path and a third coolant flow path adjacent to the second coolant flow path, and a second converter portion which is installed at a tip on the blade form portion side for connecting the third coolant flow path and a fourth coolant flow path adjacent to the third coolant flow path, with at least the first coolant flow path and the second coolant flow path extending to an outer peripheral side end of the blade form portion, and an outer peripheral side plate made of a different member from the blade form portion attached on an outer peripheral side of the blade form portion and defining outermost peripheral ends of the first coolant flow path and the second coolant flow path, the manufacturing method of the gas turbine blade comprising:
   manufacturing the blade form portion and the shank portion by precision casting using cores,
   manufacturing the outer peripheral side plate as a different member from the blade form portion and the shank portion,
   cutting the partition of the blade form portion for dividing the first coolant flow path and the second coolant flow path manufactured by casting so as to form a gap between an outer end of the partition of the blade form portion and the outer peripheral side plate, and
   attaching the outer peripheral side plate manufactured as a different member from the blade form portion over the partition of the blade form portion for dividing the first coolant flow path and the second coolant flow path, and forming the gap,
   wherein the partition extends radially from the shank portion toward the outer peripheral side plate and ends before the outer peripheral side plate to define the gap.

2. The manufacturing method of the gas turbine blade according to claim 1, wherein the second converter portion is extended to the outer peripheral side end of the blade form portion and the outer peripheral side plate defines an outermost peripheral end of the second converter portion.

3. The manufacturing method of the gas turbine blade according to claim 1, wherein the fourth coolant flow path and the first converter portion are extended to an inner peripheral side end of the shank portion, and an inner peripheral side plate made of a different member from the shank portion is attached on an inner peripheral side of the shank portion and defines innermost peripheral ends of the fourth coolant flow path and the first converter portion.

4. The manufacturing method of the gas turbine blade according to claim 1, wherein at least one of the first coolant flow path, the second coolant flow path, and the second converter portion is extended to the outer peripheral side end of the blade form portion by maintaining cross-sectional areas of the coolant flow paths.

5. The manufacturing method of the gas turbine blade according to claim 1, wherein the first converter portion is extended to the inner peripheral side end of the shank portion by maintaining the cross-sectional areas of the coolant flow paths.

6. The manufacturing method of the gas turbine blade according to claim 3, wherein the inner peripheral side plate is provided with an adjustment hole for ventilating cooling air, and the outer peripheral side plate is provided with an adjustment hole for ventilating cooling air.

7. The manufacturing method of the gas turbine blade according to claim 1, wherein the first coolant flow path is provided with a film cooling hole.

8. A gas turbine comprising gas turbine blades manufactured according to the method of claim 1.

9. The manufacturing method of the gas turbine blade according to claim 2, wherein the fourth coolant flow path and the first converter portion are extended to an inner peripheral side end of the shank portion, and an inner peripheral side plate made of a different member from the shank portion is attached on an inner peripheral side of the shank portion and defines innermost peripheral ends of the fourth coolant flow path and the first converter portion.

* * * * *